Figure 1:
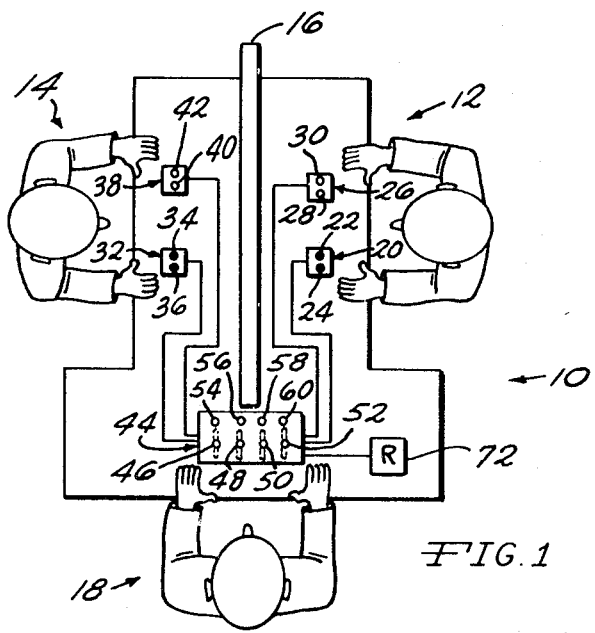

United States Patent

[11] 3,600,826

| [72] | Inventors | Edwin J. Thomas<br>2224 Vinewood Blvd., Ann Arbor, Mich. 48104;<br>Eileen D. Gambrill, 1250 Westport Road, Ann Arbor, Mich. 48103; William H. Butterfield, 1215 Washtenaw, Ypsilanti, Mich. 48197 |
|---|---|---|
| [21] | Appl. No. | 848,624 |
| [22] | Filed | Aug. 8, 1969 |
| [45] | Patented | Aug. 24, 1971 |

[54] SIGNAL SYSTEM FOR ASSESSMENT AND MODIFICATION OF BEHAVIOR
3 Claims, 2 Drawing Figs.

[52] U.S. Cl. .................................................. 35/22 R,
340/147 LP, 340/332, 273/1 E
[51] Int. Cl. ............................................... G09b 5/00
[50] Field of Search ........................................ 35/1, 8, 22;
273/1 E; 346/33, 49; 340/366, 147 LP, 332

[56] References Cited
UNITED STATES PATENTS

| 2,387,563 | 10/1945 | Chapple | 346/49 |
| 2,609,618 | 9/1952 | Chapple | 35/22 |
| 3,225,460 | 12/1965 | Randell et al. | 35/22 |

Primary Examiner—Wm. H. Grieb
Attorney—Olsen and Stephenson

ABSTRACT: A system usable for the assessment and modification of human behavior comprising a plurality of client-actuatable light-operating switch assemblies, a plurality of light assemblies connected to the switch assemblies for operation in response to selective actuation of the switch assemblies for communication purposes, and a therapist controlled switch assembly connected in circuit with the client switch assemblies and the light assemblies enabling a therapist to render the client switch assemblies inoperable and also enabling the therapist to transmit false information at the lights viewed by the clients and provide for direct intervention by the therapist in the light communication between the clients. The system of this invention enables the therapist to record and evaluate client actions and reactions and intervene for behavioral modification purposes.

PATENTED AUG 24 1971

3,600,826

INVENTORS
EDWIN J. THOMAS
EILEEN GAMBRILL
BY WILLIAM H. BUTTERFIELD

*Olsen and Stephenson*
ATTORNEYS

SIGNAL SYSTEM FOR ASSESSMENT AND MODIFICATION OF BEHAVIOR

This invention relates generally to the field of behavioral science and therapy and more particularly to apparatus enabling the behaviorally oriented practitioner to assess client behavior and intervene in that behavior for the purpose of changing client behavior.

Mechanical devices which will facilitate the collection of objective and reliable data and the production of controlled orderly changes in client behavior are highly desirable. For example, mechanical devices which can be utilized to reduce the complexity of family dynamics to manageable proportions would represent an important advance in the assessment and modification of behavior patterns in families. The fundamental purpose of the system of this invention is to assist in the assessment and modification of the real life behavior of clients with problems of this type.

The system of this invention consists generally of components for transmitting visual stimuli from one person to another, components enabling the reception of stimuli transmitted by another person, and components enabling therapist to selectively intervene in this transmission and reception process. In addition, apparatus is provided for automatically recording transmitted stimuli as data for subsequent analysis.

More specifically, the system of this invention provides a plurality of client stations and a therapist station. The clients' stations are preferably visually isolated from each other and each station includes a switch assembly consisting of two switches and a light assembly consisting of two lights of different colors, for example, red and green. The switches at one clinet's station are connected to the lights at the other client's station so that each client can signal the other by means of the lights. For example, in one behavorial analysis situation, the clients engage in discussion and each client signals the other to start talking by actuating the switch which lights the other client's green light. Conversely, the lighting of the red light signals a request to stop talking. A recorder, for example, of the moving pen-on-paper type is connected to the switch assemblies to provide data for subsequent analysis indicating the signal patterns displayed by the clients such as which of the clients dominated the discussion terms of time consumption. A therapist located at the therapist station has control of a switch assembly consisting of four level switches corresponding to the four lights located at the two client stations. Each lever switch is movable to three positions. In one position, a lever switch activates one light on one of the two client light assemblies. This enables the therapist to intervene to influence a client or clients by means of light signals. In another position, the lever switch is operable to intercept client-to-client transmissions and effectively prevent their occurrence if this is deemed desirable in a particular situation. The third position of each lever switch is an open position that allows client-to-client transmission to transpire unimpeded.

Figure 2:
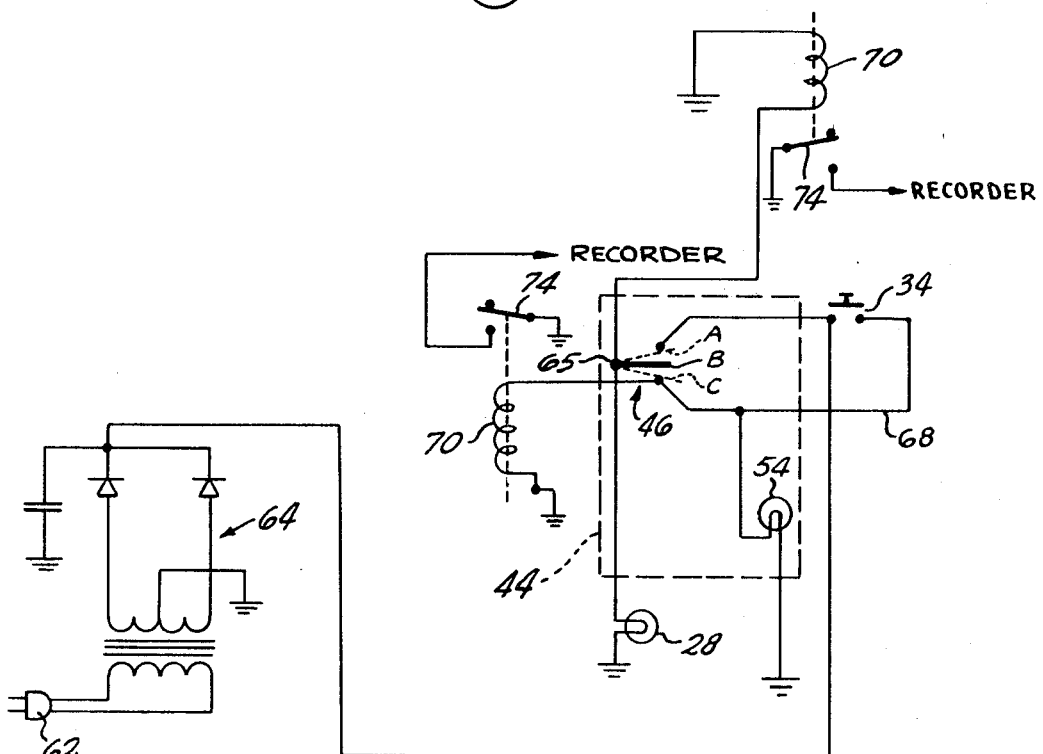

Further objects, features and advantages of this invention will become apparent from a consideration of the following description, the appended claims, and the accompanying drawing in which:

FIG. 1 is a plan view of one embodiment of the system of this invention showing two client stations and a therapist station; and FIG. 2 is a circuit diagram illustrating the connections for one client switch and one client light.

With reference to the drawing, the system of this invention, indicated generally at 10, as illustrated in FIG. 1 as including a pair of client stations 12 and 14 which are visually separated by a vertical wall 16 and a therapist station 18 which is illustrated as being in close proximity to the client stations 12 and 14 but which it is to be understood can be remotely located relative to the client stations. The client station 12 has a switch assembly 20 which includes a pair of switches 22 and 24 and a light assembly 26 which includes a green light 28 and a red light 30. Similarly, the client station 14 includes a a switch assembly 32 consisting of a pair of switches 34 and 36 and a light assembly 38 consisting of a green light 40 and a red light 42. The assemblies 20, 26, 32 and 38 are connected in circuit through a therapist control box 44 located at the therapist station 18 so that under some circumstances the switch assembly 20 is operable to actuate the light assembly 38 and the switch assembly 32 is operable to actuate the light assembly 26. The switch 22 is operable to activate light 40, switch 24 is for light 42, switch 34 is for light 28, and switch 36 is for light 30. It is to be understood that while the various lights in the system 10 are described herein as red and green, other colors could also be used satisfactorily.

The control box 44 includes four lever switches 46, 48, 50 and 52 which correspond to the lights 28, 30, 40 and 42 and four monitor lights 54, 56, 58 and 60 which correspond to the lever switches 46, 48, 50 and 52. The function of each lever switch is best understood by reference to FIG. 2 which illustrates the circuit for the lever switch 46, it being understood that similar circuits are provided for each of the other lever switches 48, 50 and 52, and detailed illustration and description of such circuits is eliminated here for purposes of clarity. The control box 44 is connected to a conventional wall plug 62 adapted to be plugged into any wall socket that is circuit connected to a conventional alternating current source and a grounded transformer and rectifier assembly 64, of conventional construction, which provides for a supply of direct current to the conductor 66. As shown in FIG. 2, the client light 28 at station 12 is connected between ground and the common pole 65 on the switch 46. The corresponding monitor light 54 is connected between ground and a conductor 68 connected to the client switch 34 at station 14. The lever switch 46 in the control box 44 is movable between the three positions previously described and indicated at FIG. 2 as positions A, B and C.

The control box 44 is also connected to a pair of pen-on-paper type recorders 72, of conventional construction, which are under the control of switches 74 that are moved to recorder actuating positions in response to energizing of grounded relays 70 connected to the switch 46. As shown in FIG. 2, when the lever switch 46 is in its intermediate position B, shown in solid lines, the therapist in effect renders the switch 34 inoperative to actuate the light 28. Thus, the therapist is able to intercept client-to-client communications by moving the lever switch 46 to position B. When the switch 46 is moved to the broken line position indicated at A, the light 28 is lighted without closing of the client operated switch 34. Thus, the therapist is able to transmit a valid or false signal to the client at station 12 indicating that the client at station 14 has actuated the switch 34 to light the green light 28 when in fact the client at station 14 may have issued no such command.

When the switch 46 is moved to the dotted line position indicated at C, the light 28 can be activated only by closing of the switch 34 so that the client station 12 without any intervention by the therapist at station 18. By observing the monitor light 54, the therapist is continuously informed of the condition of switch 34. It is to be understood that all of the lever switches 48, 50 and 52 are similarly connected so that the therapist at station 18 can actuate these switches and maintain the same type of control over the other lights 30, 40 and 42.

From the above description it is seen that this invention provides a system 10 which is usable to obtain results which were heretofore unavailable, namely, the assessment and modification of the behavior of the clients at the stations 12 and 14 by means of the light assemblies 26 and 38. It is to be understood that while only two client stations 12 and 14 have been illustrated, the system 10 is readily expandable to adapt it to a larger number of client stations.

It is also to be understood that while only two lights have been illustrated at each client station, a larger number of lights can be employed for the purpose of communicating a variety of messages in addition to those described herein for illustrative purposes. Also, tape recorder apparatus is usually employed in the system 10 to provide additional record material for evaluation and therapeutic purposes.

What is claimed is:

1. A system for the assessment and modification of human behavior comprising:

A plurality of client actuatable light-operating switch assemblies located at a plurality of client stations, a plurality of light assemblies corresponding to and connected in electrical circuit to said switch assemblies for operation in response to selective actuation of said switch assemblies so that the light assembly at one client station is operated in response to actuation of a switch assembly at another client station, said switch assemblies being operable to transmit signals representing information from one client station to another, and a therapist controlled switch assembly circuit connected in electrical circuit to said client switch assemblies and said light assemblies, said therapist switch assembly having first switch means to interrupt the circuit between a client switch assembly at one station and a light assembly at another station and second means to introduce additional signals to said client stations, said additional signals being indistinguishable from said signals transmitted from said client stations, whereby the selective operation of said therapist switch assembly can (1) permit information to be transmitted between said client station, (2) interrupt said information, and (3) introduce additional information to one of said client stations which a client falsely believes to originate at another client station.

2. A system according to claim 1 wherein each of said client switch assemblies comprises a plurality of switches and each of said light assemblies comprises a plurality of lights of different colors each of which is connected to and under the control of one of said switches in a client switch assembly.

3. A system according to claim 2 further including recorder means capable of recording switch actuation in relation to time and circuit connected to said switch assemblies.